Nov. 17, 1925.

A. H. BECK 1,562,283

MOTION PICTURE APPARATUS

Filed Nov. 17, 1921      4 Sheets-Sheet 1

INVENTOR.
Alvin H. Beck
BY Davis & Timms
his ATTORNEYS.

Nov. 17, 1925
A. H. BECK
1,562,283
MOTION PICTURE APPARATUS
Filed Nov. 17, 1921     4 Sheets-Sheet 2
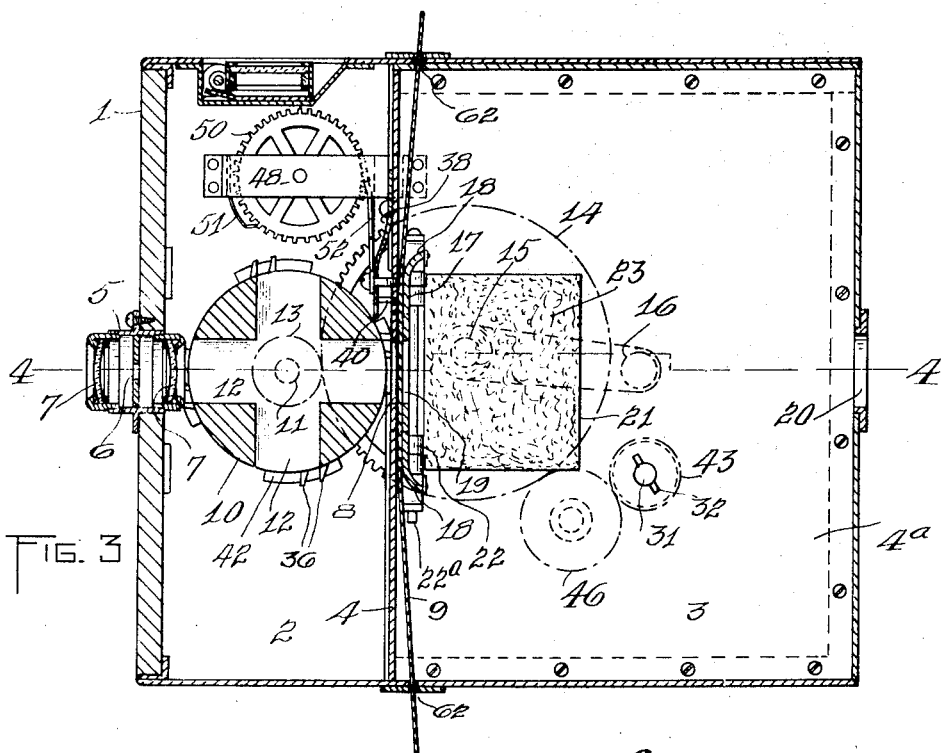
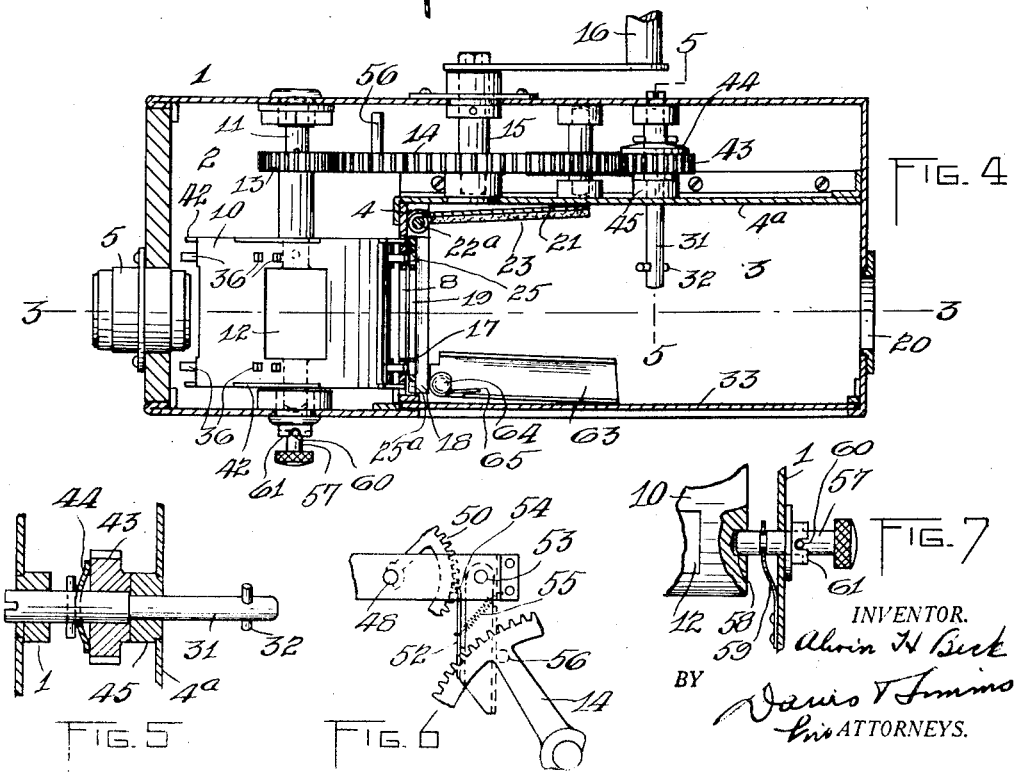
INVENTOR.
Alvin H Beck
BY Davis & Simms
His ATTORNEYS.

Nov. 17, 1925.                                            1,562,283
A. H. BECK
MOTION PICTURE APPARATUS
Filed Nov. 17, 1921          4 Sheets-Sheet 3

INVENTOR.
Alvin H Beck
BY Davis & Simms
his ATTORNEYS.

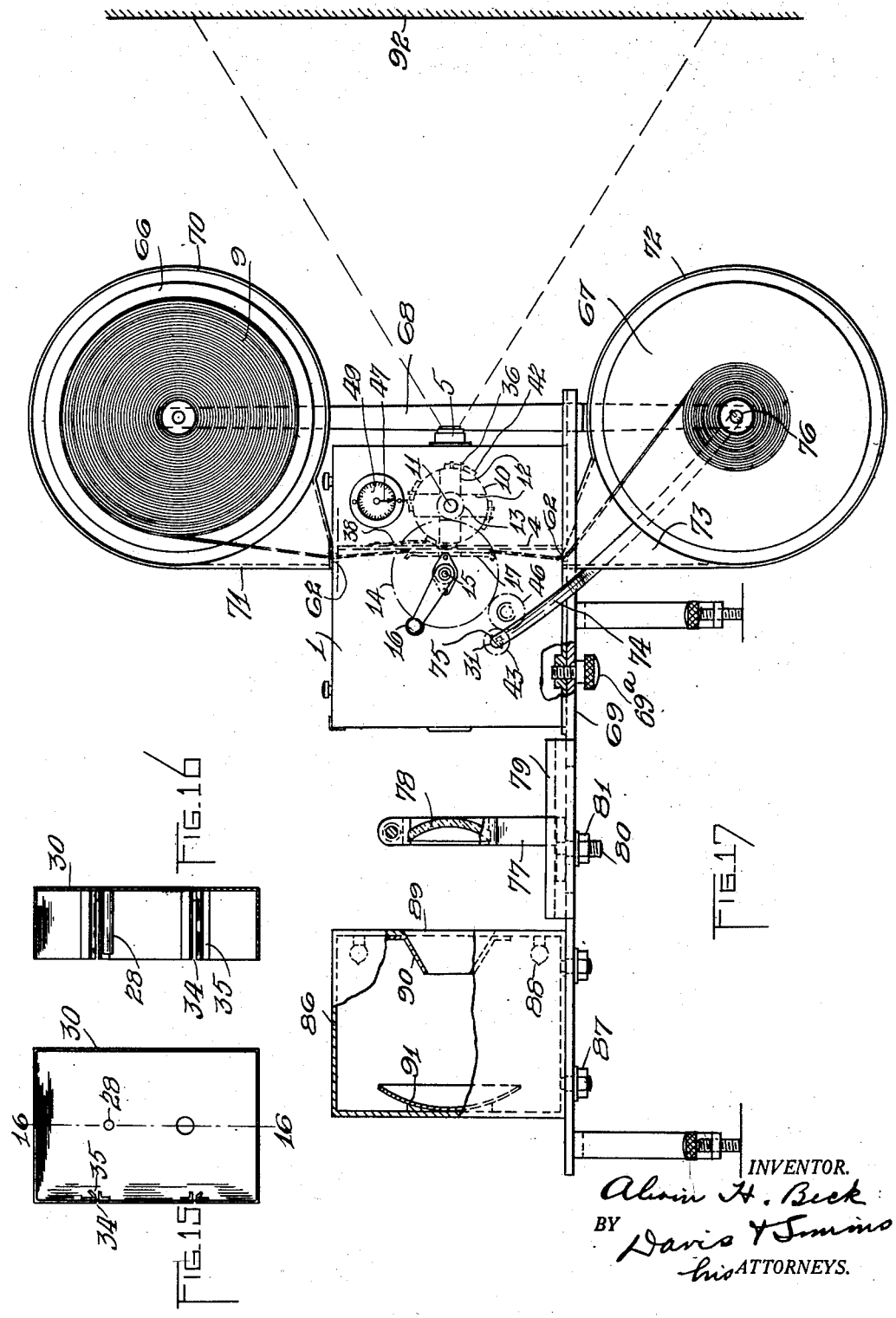

Patented Nov. 17, 1925.

1,562,283

UNITED STATES PATENT OFFICE.

ALWIN H. BECK, OF ROCHESTER, NEW YORK, ASSIGNOR TO ANTHONY BLEILE, OF ROCHESTER, NEW YORK.

MOTION-PICTURE APPARATUS.

Application filed November 17, 1921. Serial No. 515,934.

*To all whom it may concern:*

Be it known that I, ALWIN H. BECK, a citizen of the United States, and resident of Rochester, in the county of Monroe and State of New York, have invented certain new and useful Improvements in Motion-Picture Apparatus, of which the following is a specification.

The present invention relates to motion picture apparatus, and an object thereof is to provide a simple and inexpensive structure which may be used by amateurs for taking and projecting motion pictures. Another object of the invention is to provide an improved means for intermittently feeding a film for the taking or projection of pictures. A still further object of the invention is to provide a rotary shutter which carries means cooperating with the film for shifting the latter intermittently for taking or projecting motion pictures. A still further object of the invention is to provide a novel stopping means for stopping the film after each shifting, this stopping means being brought into action by the shutter after the latter has effected the shifting of the film. Another object of the invention is to provide a common driving mechanism for the shutter and a film winding means in connection with an intermittent feed mechanism for the film, this common driving mechanism having a slip connection which will permit the driving mechanism to operate the shutter, notwithstanding the fact, that the action of the film winding means is retarded. A still further object of the invention is to provide a casing adapted to support films in the interior thereof during the taking of the pictures and on the exterior thereof during the projection of the pictures. Another object of the invention is to provide a casing for a motion picture apparatus with a film holder removably arranged in the casing for taking pictures, provision being made for feeding the film through the casing from exteriorly mounted film supporting means for projecting pictures. Another object of the invention is to provide a motion picture apparatus having a casing with a removable interiorly mounted film holder and exteriorly mounted film holding means, the removable film holder controlling openings employed for the passage of film from the exteriorly mounted film holding means. Still another object of the invention is to provide a motion picture apparatus having a casing with a chamber with guiding means over which a film may be passed from the interior or exterior of said chamber, said chamber having an opening for the passage of light rays through the film when the latter is supported exteriorly to the chamber, this opening being controlled by the interiorly mounted film holder.

To these and other ends, the invention consists of certain parts and combinations of parts, all of which will be hereinafter described, the novel features being pointed out in the appended claims.

In the drawings:

Fig. 3 is a section through the apparatus on the line 3—3, Fig. 4, showing the operation of the film when supported exteriorly of the chamber;

Fig. 4 is a horizontal section on the line 4—4, Fig. 3;

Fig. 5 is a fragmentary section on the line 5—5, Fig. 4;

Fig. 6 is a detail view showing the connection between the counting means and the driving or operating means;

Fig. 7 is a detail view of a locking device for preventing the operation of the apparatus;

Fig. 15 is a detail view of the film holding box or chamber;

Fig. 16 is a section on the line 16—16, Fig. 15; and

Fig. 17 is a view showing the use of the apparatus for projecting pictures.

Figure 1:
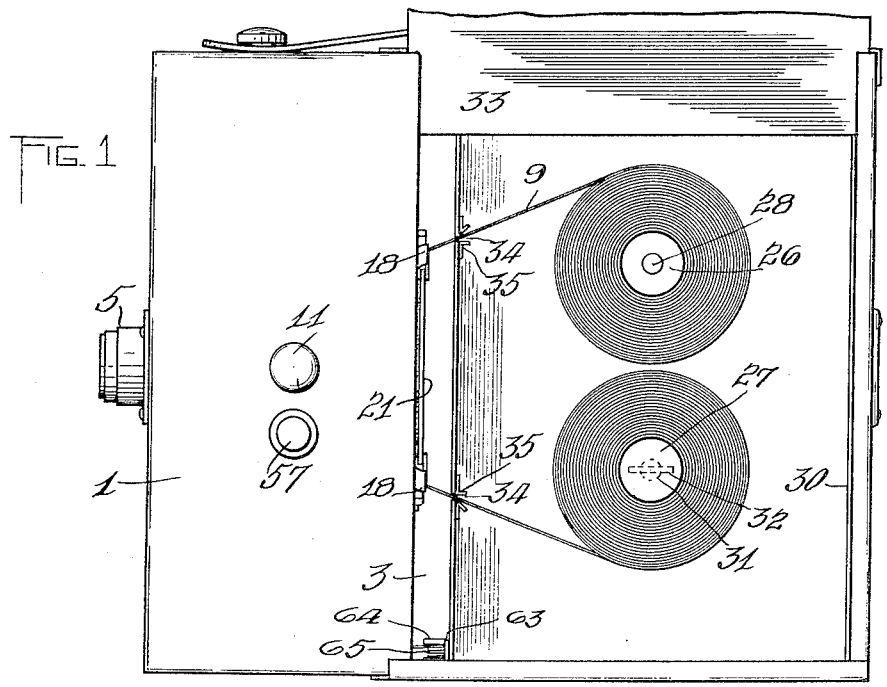
Fig. 1 shows the motion picture apparatus in side elevation with the chamber slide open to disclose the interiorly supported film holding means.
Figure 2:
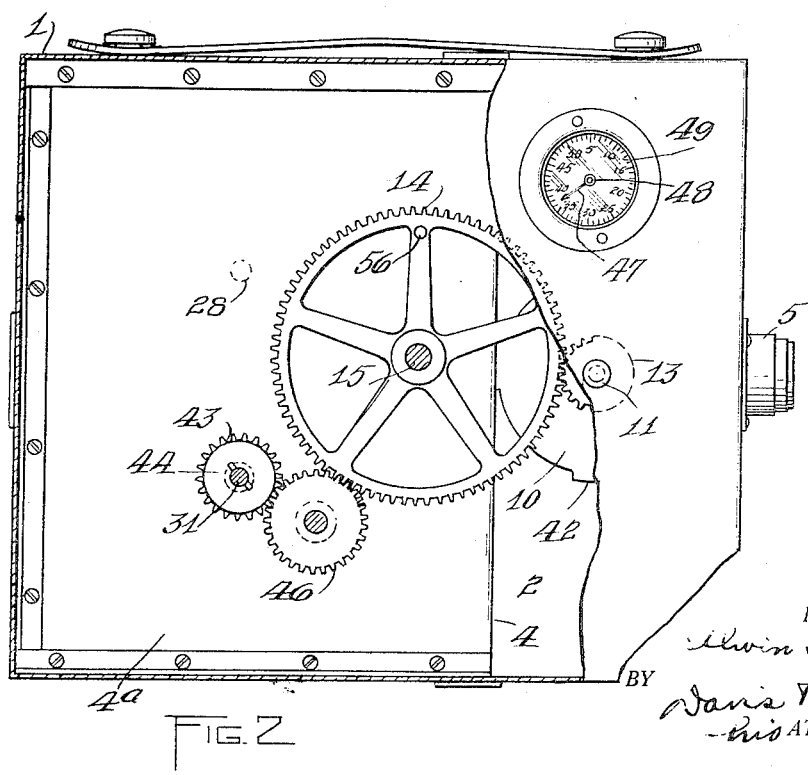
Fig. 2 is a view of the other side of the apparatus with portions broken away to illustrate interior parts.
Figure 8:
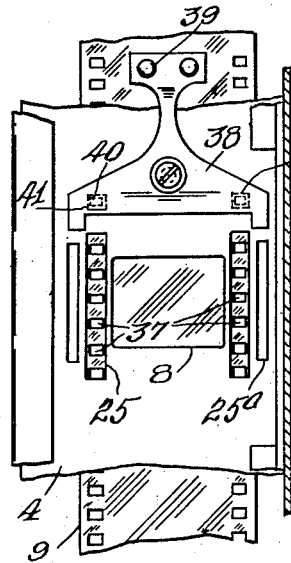
Fig. 8 is a detail view showing the portion of the film guiding means with the film stopping device associated therewith.

In the illustrated embodiment, there is provided a casing 1 having two chambers 2 and 3 separated by walls or partitions 4 and 4ª. In the front wall of the chamber 2, an exposure opening is provided preferably in the form of a mounting 5, having an exposure aperture 6 and lenses 7 on opposite sides of said opening. Alined with this exposure aperture is an exposure aperture 8 in the partition 4 and in rear of this partition 4 and over said aperture a film 9 is guided in a manner to be hereinafter described. In order to control the passage of light between the two apertures 6 and 8, a shutter is provided.

In this instance, this shutter is in the form of a drum 10, secured to a shaft 11 turning about an axis parallel with the plane of the film on the film guiding means and transversely of the length of the film, said shaft, in this instance, being journalled in the opposite side walls of the chamber 2 and the drum having two intersecting transverse openings 12 which are successively brought into alinement with the aperture 6 and 8 for the purpose of conducting light between these two apertures, the portions of the drum between the apertures serving to prevent the passage of light. Operation of this shutter may be effected in any suitable manner, as by a gear wheel 13 on the shaft 11 meshing with a larger gear 14 on a shaft 15 which is journalled in one wall of the casing 1 and also in the wall 4ª which with the wall 4 serves to provide the chamber 3. On the exterior of the casing the crank handle 16 is provided on the shaft 15 through which the gear 14 may be turned in order to turn the shaft 11 and the shutter 10.

Figure 9:
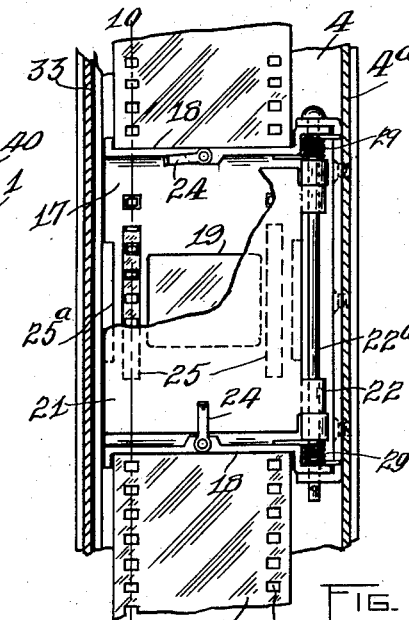
Fig. 9 is a detail view showing the manner in which the film is guided when the apparatus is used for taking pictures.

For guiding the film in rear of the aperture 8 and against the wall 4, a guide plate 17 may be provided which has its upper and lower ends deflected at 18 away from the wall 4. In order that the apparatus may serve for projecting pictures, this guide plate has an aperture 19 opposite the opening 8, and an opening 20 is provided in the outer wall of the chamber 3 opposite the opening 19 so that a passageway for light may be provided through the casing 1. In order that the aperture 19 will not interfere with the taking of the pictures, a shutter 21 is provided, in this instance, in the form of a plate hinged at 22 on a pintle 22ª, on which the guide plate 17 is also mounted to swing, and adapted to swing from the position illustrated in Figs. 3 and 4 to the position illustrated in Figs. 9 and 10, where its inner face which is covered with a light excluding material such as felt 23 will cooperate with the rear face of the guide plate 17 and effectively close the aperture 19. Pivoted latches 24 secured to the guide plate 17 may be employed for holding the shutter 21 in a closed position and springs 29 on the pintle 22ª may be employed for holding the guide plate against the wall 4. Slots 25 and 25ª are provided in the wall 4 and the guide plate 17 for receiving and permitting movement of projections 36 and 42 on the drum 10 and hereinafter described.

A sensitive film 9 for taking pictures is contained within a film holder 30 which is removably fitted in the chamber 3. To this end, the chamber 3 has one wall 33 in the form of a slide, so that said wall may be opened to permit the introduction and removal of the film holder. The film holder 30 is preferably in the form of a rectangular box like structure, one wall of which is open. The film 9 preferably is arranged on a spool or reel 26 mounted on a shaft 28 which is projected from one wall of the movable casing on film holder 30. A spool 27 is adapted to fit on a shaft 31 supported for turning in the wall 4ª and a wall of the casing, this shaft having a pin 32 projecting from one side thereof and adapted to extend through an opening in a wall of the film holder 30 and also in an end of the spool 27 in such a manner as to cause the spool to turn with the shaft 31. In order to permit the film 9, which connects the spools or reels 26 and 27, to pass through the guide on the partition 4, the film holder 30 has one wall thereof provided with two slots 34 with light excluding means 35 adjacent to such slots and fitting tightly about the film, and act as guides.

In fitting the film holder in the casing, the slide 33 is removed and the film holder with the film wrapped on the spool 26 is fitted in the casing, the spool 27 being properly fitted to the shaft 31. The free end of the film is then laced through the upper slot 34, thence through the film guide on the partition 4, and thence through the lower slot 34, after which it is secured to the spool 27. The shifting of the film, in a manner hereinafter to be more fully pointed out, will cause the film to unwind from the spool 26 and wind onto the spool 27 until the entire film has been transferred onto the spool 27.

For the purpose of advancing the film intermittently over the exposure aperture, any suitable means may be employed. In this instance, the rotary shutter 10 is provided with a number of projections 36, preferably arranged in two sets on opposite sides and at each end of each exposure opening in the shutter. These projections are adapted to engage in openings 37 formed in the film 9 along opposite edges of the latter as is customary in films used in motion picture apparatus. It is apparent that by this arrangement the film will be advanced intermittently along the guide and pass the exposure aperture.

Owing to the fact that the shutter rotates at a fairly rapid speed and will create a momentum in the film on each movement of the latter, it is desirable to provide some means to define the amount of movement of the film on each advance. This result is secured, in this instance, by a film stopping means which comprises preferably a spring arm 38 secured at 39 to the wall 4 above the opening 8 and depending toward said opening, this arm carrying two stop pins 40 passing through openings 41 in the wall 4 opposite the two series of openings 37. It is apparent that rearward movement of this arm 38 will cause the stop pins 40 to pass into openings 37 which are situated in rear of the openings 41, the spring action of the arm tending to withdraw the pins from the path of the film 9. Movement of the stopping means to effect the stopping action may be accomplished in any suitable manner. In this instance, the shutter 10 is provided at intervals with pins or projections 42 on opposite sides of the exposure apertures through the shutter. About the time that the shutter is to expose the film, two of these projections 42 cooperate with the spring arm 38 and move the stopping projections 40 into stopping position, in which position it is held until about the time an exposure aperture in the shutter is optically alined with the lens, when said arm is released and the stopping projections are moved out of stopping relation with the film 9, so that after the shutter proceeds to close, the operating projections 36 for shifting the film 9 may not have their shifting action interfered with by the stopping projections 40.

With the end in view of winding the film on the spool 27, after the latter has been shifted, means is provided for turning the shaft 31 on which the spool 27 is mounted. This means, in this instance, embodies a gear wheel 43 which has a frictional driving connection with the shaft, this driving connection being effected by mounting the gear 43 to turn relatively to the shaft 31 and providing the shaft with a spring disk 44 which bears against the gear 43 and holds it in frictional contact with a bearing piece 45 on the wall 4ª. The gear 43 in turn meshes with an idler gear 46 which meshes with the gear 14 previously described. In this way, motion is transmitted from the drive shaft 15 to the shaft 31 of the reel 27 through a slip connection. This slip connection permits the doing away with the loop now more generally present in motion picture apparatus, as it provides for substantially continuous winding of the film on the spool, while permitting an intermittent movement of the film adjacent the exposure aperture.

There may also be employed in the machine, a measuring device for measuring the amount of film passed through the guide. This measuring device, in this instance, embodies a pointer 47 on a shaft 48, this pointer travelling over a dial 49 on which may be provided indicating characters to denote feet. The shaft 48 carries a notched wheel 50 and is held against turning by a spring pawl 51. Movement of the notched wheel 50 may be effected by a pawl 52 pivoted at 53 and having a tooth 54 adapted to cooperate successively with the teeth of the wheel 50. A spring 55 normally holds this pawl 52 away from the wheel. Movement of the pawl so that the tooth 54 will engage the wheel may be effected by a lateral projection 56 on the wheel 14, this projection 56 engaging the pawl 52 on each rotation and acting to effect the operation of the pawl.

If desired, a locking device may be employed for locking the apparatus against operation. In this instance, this result is secured by providing a plunger 57 operable through a wall of the casing 1 into a notch or pocket 58 in the rotary shutter 10 as shown in Fig. 7. A spring arm 59 acts on this plunger to hold it in locking position. For holding it out of locking position, the plunger is provided with a lateral pin or projection 60 which may be brought into engagement with a shoulder 61 situated on the casing 1 at such a point that the plunger may not enter the locking notch 58.

Figure 10:
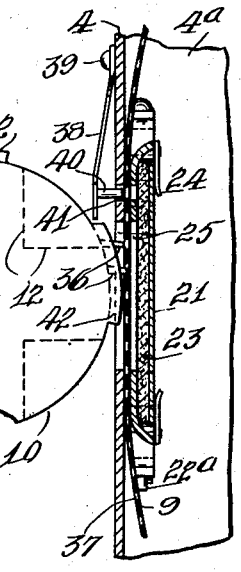
Fig. 10 is a section on the line 10—10, Fig. 9.

When using the apparatus for taking motion pictures, the parts are adjusted as shown in Figs. 1 and 10. The crank handle 16 is turned and this effects the turning of the shaft 31, as well as the shaft 11. The shutter 10 through the exposure ports or openings 12 intermittently establishes a light passageway from the lens to the film. Between each exposure the film is advanced by the teeth or projections 36 engaging with the walls of the openings 37 of the film. The momentum of the film is overcome by the stopping projections 40 which enter into engagement with the wall of the openings 37 and then release the film between the different exposures.

Figure 11:
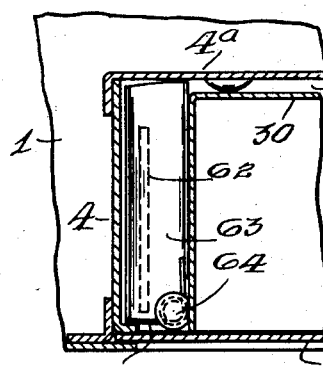
Fig. 11 is a detail view of one of the shutters employed for closing one of the slots in the casing, the shutter being shown in closed position.
Figure 13:
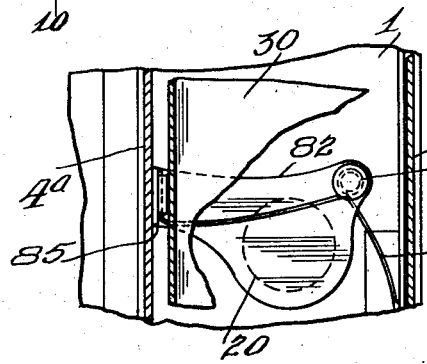
Figs. 13 and 14 are detail views showing the opening in the rear wall of the casing and the shutter for closing the same, in two positions.
Figure 12:
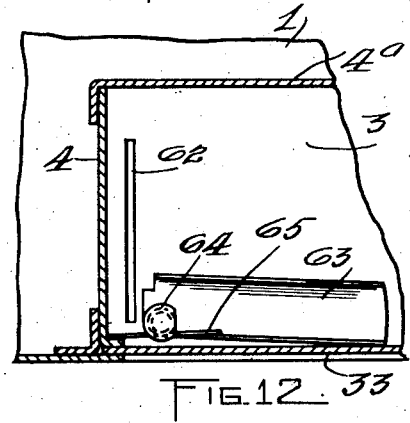
Fig. 12 is a similar view showing the slot closing shutter in open position.
Figure 14:
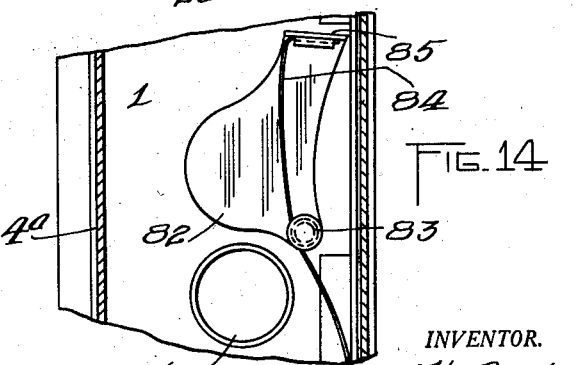

With the end in view of adapting the apparatus for projecting motion pictures, the chamber 3 is provided in its top and its bottom wall with openings or slots 62, so that the film 9 which contains the pictures to be projected may pass through both of the slots and over the guide on the rear face of the partition 4. These openings 62, when the apparatus is being used for taking pictures are preferably closed, and this result is secured by providing shutters 63 pivoted at 64 to the top and the bottom wall of the chamber 3 and each normally held in an open position by a spring 65. These shutters 63, when in open position, lie in the path of the film holder 30 when the latter is being introduced into the chamber 3, so that upon the introduction of the film holder 30, the shutters 63 are shifted from the position indicated in Fig. 12 to the position indicated in Fig. 11, thus closing the slots 62 automatically when the apparatus is to be used for taking motion pictures. It is apparent that with the removal of the film holder 30, the shutters 63 will move automatically to open positions under the actions of their springs 65.

The film during the projection of motion pictures is supported exteriorly of the casing and, to this end, is mounted on two reels 66 and 67 which turn respectively on the upper and lower ends of an upright 68 rigidly secured to a table or frame 69. A housing 70 incloses the reel 66 and has a throat 71 which is adapted to abut the casing 1 about the opening 62 in the top of the casing, when the casing 1 is secured to the table 69 as by a set screw 69ª. The reel 67 has a housing 72 with a throat 73 adapted to abut the casing 1 adjacent the opening 62 in the bottom of said casing 1. The film is advanced in the same manner as when a film is being exposed for taking pictures. That is the shutter 10 shifts such film intermittently and also effects a positive stopping thereof. Winding of the film on the reel 67 is effected from the shaft 31 by providing a flexible shaft 74, which has a detachable coupling 75 with the shaft 31 and also connects with the shaft 76 of the reel 67. It is apparent that by this arrangement, the machine when used as a projection apparatus has its reel 67 connected with the gear 43 on the shaft 31, so that a slip driving connection is provided between the reel 67 and the drive shaft 15 which operates the shutter continuously, thus permitting feeding of the film intermittently by the shutter.

The table 69 has arranged thereon a mounting 77 which carries a condensing lens 78, this mounting being adjustable in the direction of the axis of the lens on a guideway 79 and being held in its adjusted position by a depending screw portion 80 on the mounting and a nut 81 operable on the screw to cooperate with the under side of the table 69. The condensing lens is adapted to direct suitable light rays on the film 9, and to this end, the casing 1 is provided with the opening 20 in its rear wall through which the light rays may pass to the film through the opening 19 provided the shutter 21 is swung to open position and the film holder 30 is removed from the chamber 3, as illustrated in Figs. 3 and 4. When the apparatus is being used for taking moving pictures, the opening 20 is closed. This is effected preferably through a shutter 82 which is pivoted at 83 to the wall in which the opening 20 is provided, a spring 84 acting on said shutter normally to hold the latter in an open position. The shutter has a projection 85 which is engaged by the film holder 30 when the latter is introduced into the chamber 3 and, as the film holder moves to its innermost position, the shutter closes and is held in its closed position by the film holder as long as the latter lies in the chamber 3.

Any suitable type of illuminating means may be employed. In this instance, a light box 86 is secured by nuts 87 to the table 69 in rear of the condenser 78. This light box may contain any desired number of incandescent bulbs 88 arranged on the front wall thereof about an opening 89 optically alined with the condenser 78, this opening having an inwardly tapered flange 90 about the same to prevent the rays from the lamps 80 passing directly from the opening. The rays from the lamps are concentrated upon a reflector 91, which is arranged in optical relation with the opening to direct the concentrated rays on the condenser 78.

The operation of the invention when used as shown in Fig. 17 is as follows: The rays from the lamps 88 are directed by the reflector 91 through the opening 89 in the lamp box upon the condenser 78 which concentrates them upon the film. The illuminated image is then projected by the lenses 7 upon a suitable screen 92. The turning of the crank 16 effects the operation of the shutter, the feeding of the film by the shutter and the winding of the shifted film on the reel 67 through the flexible shaft 74.

From the foregoing it will be seen that there has been provided a motion picture apparatus for taking and projecting motion pictures, this apparatus being simple in operation and inexpensive to manufacture. Two film supporting means are provided, one within the casing of the apparatus, and one exteriorly of said casing. The interior film holder effects the closing of those holes in the casing which are employed when the exteriorly arranged film holder is used. Provision is made whereby the film is wound on its reel through a slip connection with a drive shaft that also effects the intermittent feeding of the film and the operation of the shutter. The feeding of the film is effected in a novel manner through a rotary shutter. This shutter also effects the stopping of the film after each intermittent feeding operation.

What I claim as my invention and desire to secure by Letters Patent is:—

1. A motion picture apparatus comprising a casing having a chamber formed with an exposure opening and an opening in the wall opposite the one with the exposure opening through which rays pass to the exposure opening, a shutter for said last mentioned opening, means normally holding said shutter in open position, guiding means for guiding a film over the exposure opening, and a film holder for effecting the closure of said shutter when the film holder is introduced into the casing.

2. A motion picture apparatus comprising a casing having a chamber formed with an exposure opening and an opening in the wall opposite the exposure opening through which rays may pass to the exposure opening from a suitable light source, said casing having slots in the top and the bottom wall of the chamber through which a film may pass, guiding means for directing such film over the exposure opening, said guiding means being arranged so that the film passing through the slots in the top and the bottom wall of the casing may also pass over said guiding means, and a film holder for effecting the closing of the openings in the top and the bottom wall and in the wall opposite the exposure opening, when such film holder is introduced in the chamber.

3. A motion picture apparatus comprising a casing having a chamber formed with an exposure opening and an opening in the wall opposite the one with the exposure opening, said casing also having slots in the top and the bottom wall, guiding means for directing a film over the exposure opening, arranged in such relation to the slots in the top and the bottom wall of the casing that a film may pass over the guiding means when passed through such openings, shutters for the slots in the top and the bottom wall of the casing and also for the opening in the wall opposite the wall having the exposure opening, and a film holder for cooperating with said shutters to effect the closure in the openings by said shutters.

ALWIN H. BECK.